3,288,735
PROCESS OF CURING UNSATURATED
POLYESTER RESIN
Hiroshi Watanabe, Nobuo Tonami, Takeshi Watanabe, and Masayuki Nanba, all of Kamakura, Japan, assignors to Toyo Koatsu Industries, Incorporated, Tokyo, Japan, a corporation of Japan
No Drawing. Filed Feb. 3, 1960, Ser. No. 6,372
10 Claims. (Cl. 260—17.4)

This invention relates to a process of curing and manufacturing articles from unsaturated polyester resins which comprises (a) the step of forming an unsaturated polyester resin into a storable and thermosettable gel which does not proceed in curing for a considerable period of time due to said resin containing a substance or substances which cause gelation to said resin at a comparatively low temperature and a substance or substances which cause initiation of polymerization to said resin at a high temperature and (b) a subsequent step of curing said gel to hard product by heating.

The present invention is based upon the following findings: (1) unsaturated polyester resins, by adding to them a "gelator" selected from (a) ionic polymerization catalysts, (b) gelling agents such as diisocyanate and butyl titanate, (c) both organic quaternary ammonium compounds and mercaptans, are converted to gels which are stable for a considerable period of time; (2) by adding free radical polymerization catalysts to said polyester resins prior to forming gels in the above manner, said gels when formed are rapidly polymerized to a hard polymer by heating. The "gelator" as employed herein is an agent causing gelation to said resin.

In the conventional methods hitherto known, the curing of unsaturated polyester resins is carried out generally at a room temperature or under heating after they have been mixed with either free radical polymerization catalysts or both free radical polymerization catalysts and promoting agents which act catalytically for the former. In such a case the resin scarcely increases in viscosity during a certain short induction period, but after the lapse of that period, they are converted to gels becoming viscous in a very short time and finally setting to a cured substance. Inasmuch as the above duration of time when the resin remains in a gel state is not longer than a few seconds to several tens of minutes, use of the resins in molding applications by utilizing its gel state on an industrial scale are accompanied with many drawbacks, difficulties and impossibilities.

Under the present invention, unsaturated polyester resins may be maintained in stable gels for a considerably long period of three days to three months or more. Thus such resins may be used as (a) coatings or adhesives in the form of filmy gels; (b) molding materials as gels in the form of sheets or blocks or as particle sized gels obtained by crushing or chopping said sheets or blocks; (c) laminating molding materials and materials for decorative plate as sheet-form gels containing glass fibre, cloth, paper or cotton cloth.

The present invention is embodied in the following process. A mixture of 100 parts comprising an unsaturated polyester resin and unsaturated monomer with 0.01–1 part of a free radical polymerization catalyst or mixture thereof is mixed with either (a) an ionic polymerization catalyst or mixture thereof which causes gelation or (b) gelling agents which cause gelation by reacting with the terminal reactive groups of the resin or (c) both organic quaternary ammonium compounds and mercaptans, thereby gelling said mixture at a room temperature or below 60° C. (this step being hereinafter referred to as the first stage): subsequently, the resulting reaction material in a gel state is heated at a high temperature whereby it is cured to a hard infusible product (this step being hereinafter referred to as the second stage). The amount of the gelator to be added to 100 parts comprising the unsaturated polyester resin and an unsaturated monomer is as follows: (a) the ionic polymerization catalysts, 0.001 to 5 parts; (b) the gelling agents, 0.001 to 5 parts; (c) the organic quaternary ammonium compounds and the mercaptans, 0.001 to 5 parts each.

The "unsaturated polyester resin" as employed in this invention is the kind of unsaturated polyester resin that is formed by the esterification of polybasic acids including an alpha,beta-olefinically unsaturated dibasic acid with mono- and/or polyvalent alcohols comprising mainly divalent alcohols. The resin then is dissolved in a monomer having an unsaturated double bond which is copolymerizable with alpha,beta-unsaturated double bonds of the polyester resin. In this instance the monomer is usually added with a polymerization inhibiting agent or mixture thereof (which will be hereinafter referred to merely as inhibitors). Typical saturated polybasic acids are the dibasic acids including phthalic acid, terephthalic acid. adipic acid, sebacic acid and the like. Typical unsaturated dibasic acids are maleic acid, fumaric acid, citraconic acid, chloromaleic acid and the like. Examples of divalent alcohols are ethylene glycol, diethylene glycol, polyethylene glycols, propylene glycol, mixed ethylene-propylene glycols, 1,6-hexanediol, 1,3-butylene glycol, 2,2-dimethyl-propane-1,3-diol, and the like. Typical unsaturated monomers copolymerizable with the unsaturated polyester resins are styrene, acrylonitrile, ethylvinylbenzene, isopropenyl toluene, vinyl benzoate, methyl acrylate, methyl methacrylate, acrolein, dimethylstyrene and the like. To exemplify, a typical unsaturated polyester resin is obtained in the following manner; anhydrous maleic acid, anhydrous phthalic acid, ethylene glycol, and propylene glycol in amounts corresponding to a respective mole ratio of 0.5:0.5:0.55:0.55 are reacted at 180° C. until the acid value of the mixture reaches 50, and unsaturated polyester resin thus formed (100 parts) is then dissolved in 50 parts of styrene monomer to which 0.05 part of hydroquinone has been added as an inhibitor.

The "inhibitor" as employed in this invention is such an agent or mixture thereof which acts to inhibit free radical polymerization of said resin and monomer in course of gelation, and is selected from: (a) phenols such as hydroquinone, para-tertiary-butylcatechol, pyrogallol, trinitrophenol, 4-ethylcatechol, 3-phenylcatechol, 3-isobutylcatechol, etc., (b) quinones such as quinone, tetrachloro-p-quinone, toluquinone, quinhydrone, etc., (c) aromatic amines such as N,N'-di-beta-naphthyl-p-phenylenediamine, N,N'-diphenyl-p-phenylenediamine, p-hydroquinone-diphenylamine, p-methyl-p-sulphonamide phenylamine, etc., (d) amine salts such as tributylamine hydrochloride, etc., (e) ascorbic acid, (f) trinitrobenzene, (g) sulphur compounds and other free radical polymerization inhibitors known in the art. The free "radical polymerization catalyst" as employed in this invention is such a catalyst in the presence of which a copolymer is formed between alpha,beta-unsaturated double bonds and unsaturated monomers which are copolymerizable therewith by the formation of free radicals. To exemplify, typical free radical polymerization catalysts are benzoyl peroxide, lauroyl peroxide, tertiary-butyl perbenzoate, methyl ethyl ketone peroxide, azobisisobutylonitrile, etc.

The "ionic polymerization catalyst" as employed in this invention is such a catalyst which causes polarization which initiates polymerization in said resin. The catalyst which gives positive electric charge to the opposite side of the carbon atom in the double bonds which is co-ordinated with said catalyst is called a cationic polymerization catalyst, whilst that which gives negative electric charge is called an anionic polymerization catalyst. The former, i.e., the cationic catalyst, is typified by inorganic strong acids, aluminum chloride, aluminum fluoride, boron trifluoride, ferric trichloride, stannic tetrachloride, and titanium tetrachloride; the latter, i.e., the anionic catalyst is typified by alkali metal alkyl compounds, alkali metal amides, alkyl aluminum compounds, alkaline earth metal alkyl compounds, triphenylmethyl bromide and Grignard's reagents.

The "gelling agent" as employed in this invention is selected from the following: (a) a compound, or mixture of compounds, which contain more than two radicals in each molecule that can be chemically bonded with the unsaturated polyester by reacting with the active hydrogen atoms of the terminal carboxyl groups or the terminal hydroxyl groups of said ester at a temperature below 60° C.; (b) a compound, or mixture of compounds, which contain more than two groups in each molecule that can be chemically bonded with the unsaturated polyester by reacting with the terminal alcoxyl groups of said polyester through an ester interchange at a temperature below 60° C. To exemplify, a typical gelling agent is tolylene diisocyanate, hexamethylene diisocyanate, triphenylmethane triisocyanate, polyaryl polyisocyanate, tetrakis-(hydroxymethyl) phosphonium chloride, carbonyl chloride, halides of elements classified in groups No. 3 to No. 8 of the periodic table, or alcoholates and their derivatives of elements classified in groups No. 3 to No. 8 of the periodic table including butyl titanate, aluminum alcoholate, aluminum alcoholate-ethyl acetoacetate chelate compound, and aluminum alcoholate-acetylacetone chelate compound.

The "organic quaternary ammonium compounds" as employed in this invention are represented by the formula:

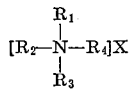

wherein (1) $R_1$, $R_2$, $R_3$ and $R_4$ are selected from the following organic functional groups: (a) saturated or unsaturated hydrocarbon groups having 1 to 18 carbon atoms such as butyl, methyl, propyl, isopropyl, primary-, secondary- or tertiary-butyls, amyl, octyl, cetyl, dodecyl, oleyl, stearyl, phenyl, benzyl, tolyl; (b) such organic acid groups, i.e., acyl groups, as have 1 to 18 carbon atoms, e.g., lauroyl, benzoyl and palmitoyl; (c) halogen and hydroxy derivatives of the groups set forth in (a) and (b) above; (d) cyclic groups wherein $R_1$, $R_2$, $R_3$ and $R_4$ are bonded together in one or two pairs to form a cyclic structure such as in pyridinium salt; (e) organic quaternaryl ammonium salt groups bonded by divalent hydrocarbon, e.g., alkylene groups, to the nitrogen shown in the above formula, such as in ethylenebis(trimethyl ammonium); and (2) wherein X is selected from (a) residual acid groups of non-oxidizable strong, inorganic acids such as hydrogen chloride, sulphuric acid, phosphoric acid, hydrogen bromide, hydrogen iodide; (b) residual acid groups of comparatively strong organic acids such as acetic acid, oxalic acid, citric acid, malonic acid, chloroacetic acid; (c) residual acid groups of hydroxy-carboxylic acid such as lactic acid; or (d) the hydroxyl group. The organic quaternary ammonium compounds as abovementioned are actually employed not only singly but also as mixtures thereof.

The "mercaptans" as employed in this invention in combination with the quaternary ammonium compounds are monovalent and divalent mercaptans selected from the following: (a) the mono-mercaptans; their organic groups being selected from the following: (i) alkyl groups having 1 to 20 carbon atoms such as methyl, ethyl, primary-, secondary- or tertiary-butyls, dodecyl, cetyl; (ii) halogen, amino or nitro derivatives of groups selected from (i) above; (iii) aryl groups such as phenyl and benzyl; (iv) unsaturated hydrocarbons such as allyl and butenyl; (b) the dimercaptans; alkane dithiols with 2 to 12 carbon atoms such as ethanedithiol and butanedithiol.

When the ionic polymerization catalyst is admixed with the mixture of unsaturated polyester resin, unsaturated monomer, inhibitor and free radical catalyst, the resin mixture polymerizes at room temperature to a gel without diminishing the effects of the inhibitor. Thereby the product of this initial polymerization has a low molecular weight, which enables the resulting unsaturated polyester resin mixture to be maintained in a stable gel state for a long period.

The gelling agent also does not act upon the unsaturated monomer, inhibitor or free radical catalyst present in the unsaturated polyester resin mixture but reacts with the active hydrogen atoms of the terminal hydroxyl and carboxyl groups of the polyester resin or it causes an ester interchange with the terminal alkoxy groups of the resin, thereby causing cross-linkages between said resin and the gelling agent. This leads to the formation of a stable gel state. Since the inhibitor remains effective in the resin mixture, the resin mixture can be maintained in a gel state for a long period of time without incurring any substantial copolymerization between the alpha,beta-unsaturated double bonds and the unsaturated monomers in said resin mixture.

When organic quaternary ammonium compounds and mercaptans are added to the unsaturated polyester resin mixture, the resin mixture is converted to a gel at a room temperature in a short period of time by the formation of cross-linkages between the alpha,beta double bonds of the polyester resin and the unsaturated monomers in the mixture. In this case, the resin is maintained in a stable gel state since the cross-linkages do not proceed any further beyond the gel stage. As one embodiment of this invention, the organic quaternary ammonium compounds are first mixed with the polyester resin and unsaturated monomer mixture, since said compounds act themselves as inhibitors, and any other inhibitor may not necessarily be added where said ammonium compounds have been added to the polyester resin in an amount of over 0.05 part for every 100 parts composed of said resin and said monomer.

The time required for complete gelation in this invention can be adjusted by varying (a) the concentration of the ionic polymerization catalyst when it is employed; (b) the concentration of the gelling agent when it is employed; (c) the concentration of each of the organic quaternary ammonium compounds and the mercaptans when they are employed. In the above (c) case, the time required for complete gelation can be lessened by adding 0.0001 to 0.1 part of metallic organic salts which is soluble in the unsaturated polyester resin and the monomer (preferably copper, cobalt, manganese, calcium or lead naphthenates) for every 100 parts comprising said resin and the monomer. In this instance, as one way of embodying this invention, the above metallic salts can be first added to the polyester resin and the monomer prior to the addition of the free radical polymerization catalysts, and the organic quaternary ammonium compounds and the mercaptans.

In gelling the unsaturated polyester resin according to the three methods of this invention hereinabove mentioned, the free radical polymerization catalysts remain intact intimately mixed with the resin mixture after the resin mixture has been converted to a gel (in the first stage) by the previous addition of said gelation catalysts to the resin mixture. The resin mixture in the gel state is then cured in the second stage by heating at 70 to 150° C. for a duration of 30 seconds to 15 minutes.

In the following there are described in detail certain practical applications of this invention.

(A) *As coating materials*:—The gel in film form is obtained in the first stage and then is attached under pressure to the object to be coated by heating in the second stage. By this treatment the resin gel in a film stage tightly adheres to the object and is cured to a coating excellent in surface hardness and resistance to chemicals. Furthermore, the film in the gel state obtained from the first stage of the process of this invention can be stored for a considerable period of time in the gel state without curing to hard, infusible products. At any time during this period it can be subjected to the second stage treatment without further formulating whenever one chooses to form the final, cured products.

(B) *As a material for forming rod- or bar-form, tubular-form, cord-form, or sheet-form products*:—The gel obtained from the first stage is subjected to pulverization and subsequently is extruded into a rod- or bar-form, tubular-form, cord-form, or sheet-form gel. The unsaturated polyester resin mixture in the liquid state with or without admixed filling materials and/or reinforcing materials can be similarly subjected to extrusion, thereby obtaining gels in similar forms. Thereafter the formed gels are subjected to curing by heating.

The gels in cord-form, sheet-form, bar- and rod-forms obtained from the first stage of this invention can be stored for a considerable period of time as so-called "pre-preg" molding materials without curing to hard, infusible products. At any time during this period they can be subjected to the second stage treatment whenever one chooses to obtain the final cured product. The tubular-form gel obtained from the first stage is very much suited for the continuous production of pipes.

(C) *As molding materials for making small molded products*:—Liquid unsaturated polyester resin mixture is poured into a hollow horizontal cylinder wherein it is subjected to rotation while it gels, thereby forming a bar or tubular gel which, after being cut or punched to desired forms, is subjected to pressed molding to obtain small molded products such as buttons.

(D) *As materials for making so-called "pre-mix compounds"*:—The unsaturated polyester resin mixture (itself or admixed with filling agents) impregnated onto with continuous fibrous reinforcing materials (such as glass roving) is subjected to gelation and thereafter it is cut into a desired length to obtain straw-form "pre-mix compounds." The compounds are then molded and cured under heat and pressure to produce molded article. When the liquid unsaturated polyester resin mixture, which may or may not contain filling materials, is mixed in a mixer with chopped glass fibers and gelation is brought about, puffy-form pre-mix compounds are obtained. These "pre-mix compounds" can stably be stored for a considerable period, during which period they can be molded at any time one chooses.

(E) *As materials for manufacturing large-size molded products such as boat-hulls and automobile bodies*:— Both a fibrous reinforcing material such as glass roving cut into the desired length and the liquid unsaturated polyester resin mixture are sprayed simultaneously onto a form to obtain a product in the desired form. The product is then allowed to gel and thereafter it is cured under heat and pressure. Thus the pre-forming of large-size molded products can be effectuated easily and economically in the above manner. Besides, the pre-formed, gelled but uncured products can be stored for a considerably long period of time.

(F) *As materials for making other products*:—(i) Particle-size or sheet-form gels as molding materials which do not contain reinforcing or filling materials are put in a metallic mold, wherein they are pressed at 3–30 kg./cm.$^2$ under heating at 80–150° C. for 30 seconds to 15 minutes to obtain a hard molded product. (ii) Sheet-form gel which contains glass fibre, paper, cotton cloth, knitted bamboo or knitted wood-plats is formed into contoured sheets having the desired curved surfaces, and the contoured sheets are then heated to 80–150° C. for 30 seconds to 15 minutes to cure them into hard, strong, laminated molded products having the desired curved surfaces. The gels obtained from the first stage of this invention can be stably stored for a long period as so-called "pre-preg" molding materials, during which period they can be subjected as desired to the second stage treatment at any time to obtain hard, final products.

The instant invention can equally be applied to and embodied in not only (*a*) the unsaturated polyester resin mixture itself, but also (*b*) mixtures of the resin mixture with calcium carbonate, barium sulphate, clay, metallic powder, glass powder, coloring agents or other pulverized substances, and (*c*) resin mixtures to which have been added such fibrous substances as glass fibre, cotton fibre, jute fibre, asbestos and synthetic fibres.

The following examples describe in detail certain embodiments or illustrations of the instant invention. However, it should be understood that the invention is not confined in scope to these examples. In the examples all parts are by weight.

*Example 1*

100 parts of unsaturated polyester resin obtained by heating at 180° C. a mixture of anhydrous maleic acid, anhydrous phthalic acid and propylene glycol in an amount corresponding to a molecular ratio of 0.5:0.5:1.1 until the acid value of the material reached 50, was dissolved in 50 parts of styrene to which 0.05 part of hydroquinone had been added as an inhibitor. After mixing the solution with 1 part of benzoyl peroxide, there was 0.8 part of boron trifluoride acetic acid complex (adduct). The resulting mixture was kept standing at 20–30° C. for 10–30 hours to obtain a sheet in a gel state. The sheet was stored in a gel state for 3 weeks at 20–30° C., and thereafter it was heated in a metallic mold at 120° C. for 5 minutes to obtain a hard, infusible molded product.

*Example 2*

100 parts of unsaturated polyester resin obtained by heating at 180° C. a mixture of anhydrous maleic acid, anhydrous phthalic acid and propylene gylcol in an amount corresponding to a molecular ratio of 0.5:0.5:1.1 until the acid value of the material reached 50, with which 0.2 part of trimethyl benzyl ammonium chloride, 0.00001 part of copper naphthenate, and 50 parts of styrene had been mixed, was added with 0.8 part of caproyl peroxide. Then 3 parts of pearl essence and 0.03 part of butyl mercaptan were added with agitation to the mixture. The resulting mixture was then cast in a horizontal cylinder under rotation at a temperature of 35° C. for one hour to obtain a hollow pipe in a gel state with pearl lustre. The pipe was then cut longitudinally into sheets. Each sheet was able to be stored in a gel state at 25–30° C. for over one month. The sheets were then put into metallic molds either as sheets, or after having been pulverized to particles, and then cured under heating at 120° C. and pressure for 3 minutes to obtain molded products such as hard buttons.

Example 3

100 parts of unsaturated polyester resin obtained by heating at 180° C. a mixture of anhydrous maleic acid, anhydrous phthalic acid and propylene glycol in an amount corresponding to a molecular ratio of 0.5:0.5:1.1 until the acid value of the material reached 50, with which 0.3 part of triethylphenyl ammonium chloride and 60 parts of styrene had been mixed, was further mixed with 50 parts of calcium carbonate, 0.8 part of benzoyl peroxide and 0.05 part of dodecyl mercaptan. Glass roving was impregnated with the resulting mixture and then heated to 40° C. for 2 hours, whereby it was converted to a tack-free gel. The impregnated glass roving was cut into 2 inch pieces to obtain a "pre-mix compound." The compound was stored for 4 weeks without hardening or curing. It was then put into a metallic mold wherein it was molded at 120° C. and at a pressure of 50 kg./cm.$^2$ for 3 minutes into a molded product having excellent mechanical strength. Characteristics of the product were: flexural strength 25 kg./mm.$^2$, tensile strength 18 kg./mm.$^2$, and impact strength 86 kg. cm./cm.$^2$.

Example 4

66.7 parts of unsaturated polyester resin obtained by heating at 180° C. a mixture of anhydrous maleic acid, anhydrous phthalic acid and propylene glycol in an amount corresponding to a molecular ratio of 0.5:0.5:1.1 until the acid value of the material reached 50, was dissolved in 33.3 parts of styrene to which 0.03 part of hydroquinone had been added as an inhibitor. After mixing the solution with 1 part of tertiary butyl perbenzoate and 2 parts of triphenyl methane triisocyanate, and the mixture, after having been impregnated on glass cloth, formed into a sheet, was placed between polyethylene film, rolled and kept standing for 20 hours at 20–30° C. Thereby a tack-free molding material in sheet form was obtained. This was stored stably for 30 days, and then it was laminated in ten plies and was placed in a metallic mold wherein it was subjected to pressing at 120° C. and 30 kg./cm.$^2$ for 5 minutes to obtain a hard, laminated, molded product.

Example 5

A solution comprising 66.7 parts of the unsaturated polyester resin, 33.3 parts of styrene and 0.03 part of hydroquinone similar to that in the preceding example was mixed with 0.5 part of parachlorobenzoyl peroxide and 2 parts of aluminum triisopropylate, whereby the resulting mixture was converted to a gel in a few minutes at a room temperature. It was stably stored for a fortnight at 20 to 30° C. Then it was pulverized to a suitable particle-size one and was placed in a metallic mold wherein it was subjected to pressing at 130° C. and 30 kg./cm.$^2$ for 3 minutes whereby a transparent and infusible hard molded product was obtained.

Example 6

100.03 parts of the solution similar to that in Example 4 was mixed with 0.7 part of benzoyl peroxide and 4 parts of butyl titanate, and the mixture, after having been impregnated on paper or cloth which bear patterns, was formed into a sheet, which was placed on polyethylene-laminated cellophane paper, rolled and was maintained for 2 hours at a room temperature. Thereby a tack-free laminating material in sheet form was obtained. This was stored for 30 days at a room temperature. After tearing off the paper employed, said material was placed on a plywood plate 5 millimeters in thickness and a stainless lustrous plate was placed on it. Then it was subjected to pressing at 120° C. and 15 kg./cm.$^2$ for 10 minutes whereby the material tightly adhered to the plywood plate. Thus a beautiful decorative plate with a lustrous surface was obtained.

Example 7

100.03 parts of the solution similar to that in Example 4 was mixed with 3 parts of pearl essence, 0.8 part of lauroyl peroxide and 4 parts of aluminum diisopropylate-ethylacetoacetate chelate compound, whereby the resulting mixture was converted to a gel in 2 hours at a room temperature. It was stored stably for about a fortnight at a room temperature. The gel, after having been chopped to suitable-sized pieces, was placed in a metallic mold wherein it was subjected to pressing at 120° C. and 30 kg./cm.$^2$ for 3 minutes to obtain a resinous product with pearl lustre. Manufacture of buttons in this manner resulted in a saving of materials by about 20% compared with the conventional centrifugal method, namely the casting in a horizontal cylinder under rotation.

What is claimed is:

1. The process of manufacturing articles from curable olefinically unsaturated polyester resins which comprises the steps of, (A) mixing said resin with (a) a monomeric organic compound having an olefinic double bond which reacts with the olefinic unsaturated bond of said polyester resin in copolymerization by a free radical polymerization catalyst, and a catalyst system consisting essentially of (b) a free radical polymerization catalyst which is active only at temperatures above 60° C., said free radical polymerization catalyst being in an amount of 0.01 to 1 part by weight for each 100 parts of the mixture of said resin and said monomeric organic compound, and (c) both a tetraorganic quaternary ammonium compound and an organic mercaptan; (B) allowing the resulting resinous mixture to react at a temperature below about 60° C. to form a deformable gel which is stable to prolonged storage; and (C) thereafter subjecting said gel to temperatures above about 60° C. to cure said gel to a hard product.

2. The process of manufacturing articles from olefinically unsaturated polyester resins as claimed in claim 1 wherein said free radical polymerization catalysts are selected from the group consisting of benzoyl peroxide, parachlorobenzoyl peroxide, di-tertiary-butyl peroxide, tertiary butyl perphthalic acid, 2.2-bis(tertiary butyl) peroxybutane, tertiary-butyl peracetate, di-cumyl peroxide, lauroyl peroxide, azo-bis-isobutylonitrile, and azo-bis-phenylethane and step (C) is carried out at least four weeks after formation of said gel.

3. The process as claimed in claim 1 wherein said gelator is an organic quaternary ammonium compound and an organic mercaptan each in the amount of 0.001 to 5 parts by weight for each 100 parts by weight comprising said resin and said monomer.

4. The process as claimed in claim 1 wherein the gel is shaped into an article prior to heating to cure.

5. The process as claimed in claim 1 wherein said gel is formed in a rotating, horizontal cylinder.

6. The process as claimed in claim 1 wherein said gel is formed in a mixer in the presence of a fibrous filler.

7. The process as claimed in claim 1 wherein an inert film sheet is coated with said resinous mixture prior to formation of said gel, the gel after it is formed on said film is attached to an object under pressure, and the film is stripped off after curing.

8. The process as claimed in claim 1 wherein fabrics are impregnated with said resinous mixture prior to formation of a gel and the impregnated fabrics are formed into contoured shapes after gelation but before heating to cure whereby after heating contoured articles are formed.

9. The process as claimed in claim 1 wherein continuous fibres are impregnated with said resinous mixture prior to the formation of a gel, the impregnated fibres are cut into pieces each 3 mm. to 150 mm. in length after gelation and are molded and cured under pressure and heat to produce hard, molded products.

10. The process as claimed in claim 1 wherein said resulting resinous mixture is sprayed together with a fibrous material onto a preformed mold, allowing said mixture to gel and subsequently heating the gel thus obtained under pressure to form a molded product.

References Cited by the Examiner

UNITED STATES PATENTS

| | | | |
|---|---|---|---|
| 2,467,527 | 4/1949 | Harris | 260—863 |
| 2,593,787 | 4/1952 | Parker | 260—863 |
| 2,780,616 | 2/1957 | Rubens | 260—863 |
| 2,822,345 | 2/1958 | Dubnkrack et al. | 260—863 |
| 2,946,770 | 7/1960 | Bader et al. | 260—861 |

OTHER REFERENCES

Bjorksten: Polyesters and Their Applications, Reinhold Publishing Corp., N.Y., 1956, pages 46–65.

WILLIAM H. SHORT, *Primary Examiner*.

DANIEL ARNOLD, LEON J. BERCOVITZ, LOUISE P. QUAST, *Examiners*.

E. B. WOODRUFF, J. NORRIS, *Assistant Examiners*.